(12) United States Patent
Fujii et al.

(10) Patent No.: US 12,549,110 B2
(45) Date of Patent: Feb. 10, 2026

(54) POWER CONVERSION DEVICE SIMULATING A SYNCHRONOUS GENERATOR

(71) Applicant: Mitsubishi Electric Corporation, Tokyo (JP)

(72) Inventors: Toshiyuki Fujii, Tokyo (JP); Kaho Mukunoki, Tokyo (JP); Hiroki Ishihara, Tokyo (JP); Ryosuke Uda, Tokyo (JP); Kota Hamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 271 days.

(21) Appl. No.: 18/567,806

(22) PCT Filed: Jun. 24, 2021

(86) PCT No.: PCT/JP2021/023949
§ 371 (c)(1),
(2) Date: Dec. 7, 2023

(87) PCT Pub. No.: WO2022/269857
PCT Pub. Date: Dec. 29, 2022

(65) Prior Publication Data
US 2024/0275301 A1    Aug. 15, 2024

(51) Int. Cl.
*H02J 3/38*    (2006.01)
*H02M 7/48*    (2007.01)

(52) U.S. Cl.
CPC ............ *H02M 7/48* (2013.01); *H02J 3/381* (2013.01)

(58) Field of Classification Search
CPC .................................. H02M 7/48; H02J 3/381
See application file for complete search history.

(56) References Cited

U.S. PATENT DOCUMENTS 9,300,142 B2 *   3/2016   Tarnowski ............. H02J 3/381
2021/0194383 A1   6/2021   Tsuruma et al.
2022/0399801 A1 * 12/2022   Suzuki ............... H02M 1/0093

FOREIGN PATENT DOCUMENTS

CN    109861296 A  *  6/2019
EP    3780310 A1     2/2021
(Continued)

OTHER PUBLICATIONS

Machine translation of CN 109861296 by Clarivate Analytics, Oct. 2025, 8 pages.*

(Continued)

*Primary Examiner* — Harry R Behm
(74) *Attorney, Agent, or Firm* — .Buchanan Ingersoll & Rooney PC

(57) ABSTRACT

A power conversion device includes a power converter and a control device. The power converter converts a DC power output from a power storage element into an AC power. The control device includes a phase synchronizing unit to estimate a reference phase of an output voltage of the power converter synchronized with a phase of an AC voltage at an interconnection point, a characteristics simulating unit to generate an active power command value based on a phase difference between a reference phase and the phase of the AC voltage at the interconnection point, a DC voltage command generating unit to generate a DC voltage command value, a voltage command generating unit to generate an AC voltage command value so that an output current of the power converter becomes less than a threshold, and a signal generating unit to generate a control signal based on the AC voltage command value.

15 Claims, 7 Drawing Sheets

(56) References Cited

FOREIGN PATENT DOCUMENTS

| | | |
|---|---|---|
| JP | 2019080476 A | 5/2019 |
| JP | 2019176584 A | 10/2019 |
| WO | 2019116419 A1 | 6/2019 |

OTHER PUBLICATIONS

International Search Report (PCT/ISA/210) and Written Opinion (PCT/ISA/273) with translation mailed on Sep. 7, 2021, by the Japan Patent Office as the International Searching Authority for International Application No. PCT/JP2021/023949. (8 pages).

* cited by examiner

POWER CONVERSION DEVICE SIMULATING A SYNCHRONOUS GENERATOR

TECHNICAL FIELD

The present disclosure relates to a power conversion device.

BACKGROUND ART

In recent years, many distributed power sources using renewable energy such as photovoltaic power systems have been introduced to power grids. Distributed power sources are often connected to a power grid through a power converter. Therefore, as the number of distributed power sources connected to a power grid increases, the proportion of synchronous power generators connected to the power grid decreases and the inertia energy in the power grid decreases, which increases a change in frequency at a time of load abrupt change. Virtual synchronous machine control has been proposed, which allows a power converter to behave similarly to a synchronous generator and thereby makes up for the decreased inertia energy. The power converter with virtual synchronous machine control is controlled so as to simulate the behavior of a synchronous generator to be simulated being connected to a power grid.

For example, an AC/DC converter control device according to Japanese Patent Laying-Open No. 2019-80476 (PTL 1) includes a generator characteristics computing unit to compute synchronous generator characteristics so that a power output from a storage battery has characteristics equivalent to the characteristics of a synchronous generator, and an output current suppressing unit to change an internal impedance of a virtual synchronous generator so that an output current of an AC/DC converter does not exceed a current limit value when a short-circuit fault occurs in a power grid.

CITATION LIST

Patent Literature

PTL 1: Japanese Patent Laying-Open No. 2019-80476

SUMMARY OF INVENTION

Technical Problem

PTL 1 proposes to change the internal impedance of the virtual synchronous generator so that output current of the power converter does not exceed a current limit value. However, there is room for improvement in suppressing overcurrent, because the output current of the power converter is indirectly controlled.

An object in an aspect of the present disclosure is to provide a power conversion device capable of suppressing overcurrent more accurately while performing the control that simulates a synchronous generator.

Solution to Problem

A power conversion device according to an embodiment includes a power converter to perform power conversion between a power storage element and a power grid, and a control device to control the power converter. The power converter converts a DC power output from the power storage element into an AC power and outputs the AC power to the power grid. The control device includes a phase synchronizing unit to estimate a reference phase of an output voltage of the power converter synchronized with a phase of an AC voltage at an interconnection point between the power grid and the power converter, based on the AC voltage at the interconnection point, a characteristics simulating unit to generate an active power command value for the power converter by simulating characteristics of a synchronous generator based on a phase difference between the reference phase estimated by the phase synchronizing unit and the phase of the AC voltage at the interconnection point, a DC voltage command generating unit to generate a DC voltage command value for the power converter, based on the active power command value and a DC voltage of the power storage element, a voltage command generating unit to generate an AC voltage command value for the power converter so that an output current of the power converter becomes less than a threshold, based on the DC voltage command value, a grid voltage command value indicating a target value of the AC voltage at the interconnection point, and the reference phase, and a signal generating unit to generate a control signal for the power converter, based on the AC voltage command value.

Advantageous Effects of Invention

The present disclosure provides a power conversion device capable of suppressing overcurrent more accurately while performing the control that simulates a synchronous generator.

DESCRIPTION OF EMBODIMENTS

Embodiments will be described below with reference to the drawings. In the following description, like parts are denoted by like signs. Their names and functions are also the same. A detailed description thereof will not be repeated.

First Embodiment

<Overall Configuration>

Figure 1:
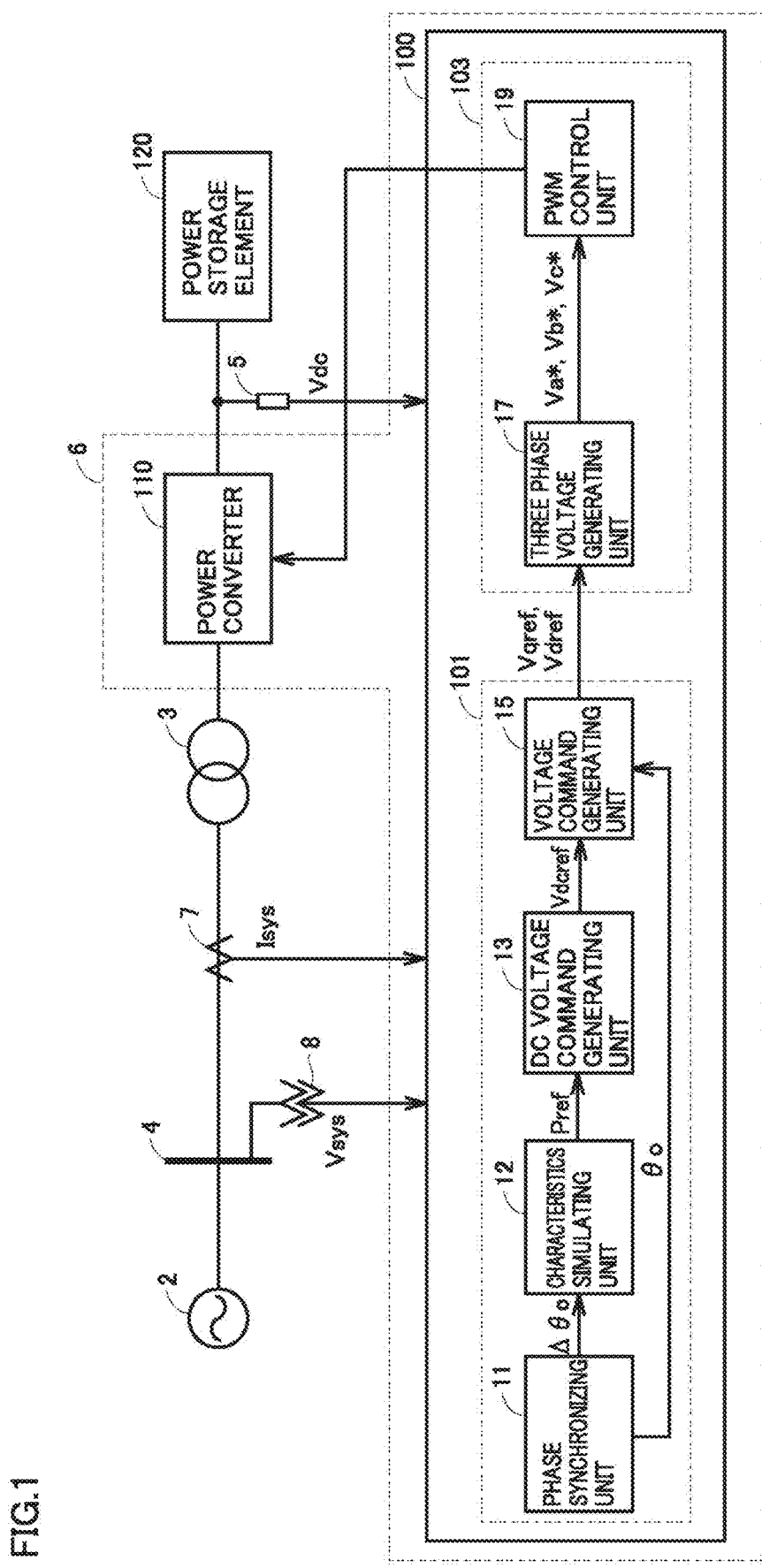
FIG. 1 is a diagram showing an overall configuration of a power conversion system according to a first embodiment.

FIG. 1 is a diagram showing an overall configuration of a power conversion system according to a first embodiment. The power conversion system includes a power grid 2, a transformer 3, a DC voltage detector 5, a power conversion device 6, a current detector 7, a voltage detector 8, and a power storage element 120. Power grid 2 is, for example, a three phase AC power source. Power conversion device 6 includes a control device 100 and a power converter 110. Power converter 110 is connected to an interconnection point 4 of power grid 2 through transformer 3. Instead of transformer 3, an interconnection reactor may be connected to power converter 110.

Power converter 110 is a power converter connected to power storage element 120 to perform power conversion between power storage element 120 and power grid 2. Specifically, power converter 110 converts a DC power output from power storage element 120 into an AC power and outputs the AC power to power grid 2 through transformer 3. Power converter 110 also converts an AC power from power grid 2 into a DC power and outputs the DC power to power storage element 120. Power converter 110 thus charges and discharge power of power storage element 120. Power converter 110 is, for example, a self-commutated converter such as a two-level converter, a three-level converter, or a modular multilevel converter. Power storage element 120 is, for example, an energy storage element such as an electric double layer capacitor or a secondary battery.

Current detector 7 detects three phase AC current at interconnection point 4 between power grid 2 and power converter 110. Specifically, current detector 7 detects an a-phase AC current Ia, a b-phase AC current Ib, and a c-phase AC current Ic flowing between interconnection point 4 and power converter 110. AC currents Ia, Ib, and Ic are input to control device 100. Hereinafter AC currents Ia, Ib, and Ic may be collectively referred to as AC current Isys.

Voltage detector 8 detects three phase AC voltage at interconnection point 4 of power grid 2. Specifically, voltage detector 8 detects an a-phase AC voltage Vsysa, a b-phase AC voltage Vsysb, and a c-phase AC voltage Vsysc at interconnection point 4. AC voltages Vsysa, Vsysb, and Vsysc are input to control device 100. Hereinafter AC voltages Vsysa, Vsysb, and Vsysc may be collectively referred to as AC voltage Vsys.

DC voltage detector 5 detects a DC voltage Vdc output from power storage element 120. DC voltage Vdc is input to control device 100. It can be said that DC voltage Vdc is DC voltage output from power converter 110.

Control device 100 is a device that controls the operation of power converter 110. Specifically, control device 100 includes, as a main functional configuration, a generator simulating unit 101 and a signal generating unit 103. The functions of generator simulating unit 101 and signal generating unit 103 are implemented by a processing circuit. The processing circuit may be dedicated hardware or may be a CPU that executes a program stored in an internal memory of control device 100. When the processing circuit is dedicated hardware, the processing circuit is configured with, for example, an FPGA, an ASIC, or a combination thereof.

Generator simulating unit 101 generates a voltage command value for power converter 110 by simulating the characteristics of a synchronous generator based on AC voltage Vsys and AC current Isys at interconnection point 4. Specifically, generator simulating unit 101 includes a phase synchronizing unit 11, a characteristics simulating unit 12, a DC voltage command generating unit 13, and a voltage command generating unit 15.

Phase synchronizing unit 11 is configured with a phase locked loop (PLL). Phase synchronizing unit 11 estimates a reference phase θo of output voltage of power converter 110 synchronized with a phase θsys of AC voltage Vsys, based on AC voltage Vsys at interconnection point 4 detected by voltage detector 8. Reference phase θo is a phase serving as a reference used for control of power converter 110. Phase synchronizing unit 11 outputs a phase difference Δθo between phase θsys of AC voltage Vsys and reference phase θo to characteristics simulating unit 12. Phase synchronizing unit 11 also outputs reference phase θo to voltage command generating unit 15.

Characteristics simulating unit 12 simulates the characteristics of a synchronous generator based on phase difference Δθo between phase θsys of AC voltage Vsys and reference phase θo to output an active power command value Pref indicating a target value of active power to be output to simulate the characteristics.

DC voltage command generating unit 13 generates a DC voltage command value Vdcref for power converter 110, based on active power command value Pref and a DC voltage of power storage element 120 detected by DC voltage detector 5.

Voltage command generating unit 15 generates an AC voltage command value of power converter 110 so that output current of power converter 110 becomes less than a threshold Th, based on DC voltage command value Vdcref, a grid voltage command value Vsysref indicating a target value of AC voltage Vsys, and reference phase θo. The AC voltage command value includes an active voltage command value Vqref and a reactive voltage command value Vdref.

Signal generating unit 103 generates a control signal for power converter 110, based on an AC voltage command value generated by generator simulating unit 101, and outputs the generated control signal to power converter 110. Specifically, signal generating unit 103 includes a three phase voltage generating unit 17 and a pulse width modulation (PWM) control unit 19.

Three phase voltage generating unit 17 generates three phase sinusoidal voltages Va*, Vb*, and Vc* by two phase/three phase conversion, based on active voltage command value Vqref, reactive voltage command value Vdref, and reference phase θo.

PWM control unit 19 performs pulse width modulation for each of three phase sinusoidal voltages Va*, Vb*, and Vc* and generates a control signal as a PWM signal. PWM control unit 19 outputs the control signal to power converter 110. Typically, the control signal is a gate control signal for controlling the on/off of each switching element included in power converter 110.

<Hardware Configuration>

Figure 2:
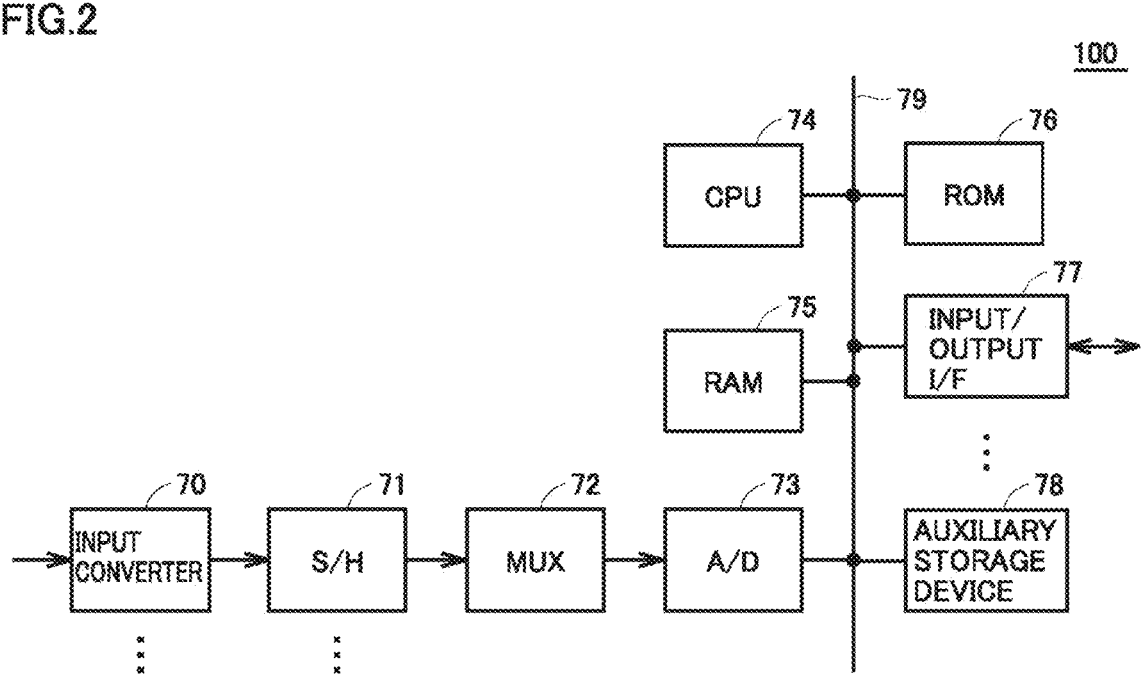
FIG. 2 is a diagram showing a hardware configuration example of a control device.

FIG. 2 is a diagram showing a hardware configuration example of the control device. FIG. 2 shows an example in which control device 100 is configured with a computer.

Referring to FIG. 2, control device 100 includes one or more input converters 70, one or more sample and hold (S/H) circuits 71, a multiplexer (MUX) 72, an A/D converter 73, one or more central processing units (CPU) 74, a random access memory (RAM) 75, a read only memory (ROM) 76, one or more input/output interfaces 77, and an auxiliary storage device 78. Control device 100 also includes a bus 79 connecting the components to each other.

Input converter 70 has an auxiliary transformer for each input channel. Each auxiliary transformer converts a detection signal by current detector 7 and voltage detector 8 in FIG. 1 into a signal with a voltage level suitable for the subsequent signal processing.

Sample and hold circuit 71 is provided for each input converter 70. Sample and hold circuit 71 samples and holds a signal indicating the electrical quantity received from the corresponding input converter 70 at a preset sampling frequency.

Multiplexer 72 sequentially selects signals held by a plurality of sample and hold circuits 71. A/D converter 73 converts a signal selected by multiplexer 72 into a digital value. A plurality of A/D converters 73 may be provided to perform A/D conversion for detection signals of a plurality of input channels in parallel.

CPU 74 controls the entire control device 100 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detection values.

Input/output interface 77 is an interface circuit for communication between CPU 74 and an external device.

Unlike the example of FIG. 2, at least a part of control device 100 may be configured using circuitry such as a field programmable gate array (FPGA) and an application specific integrated circuit (ASIC).

<Specific Functional Configuration>

Figure 3:
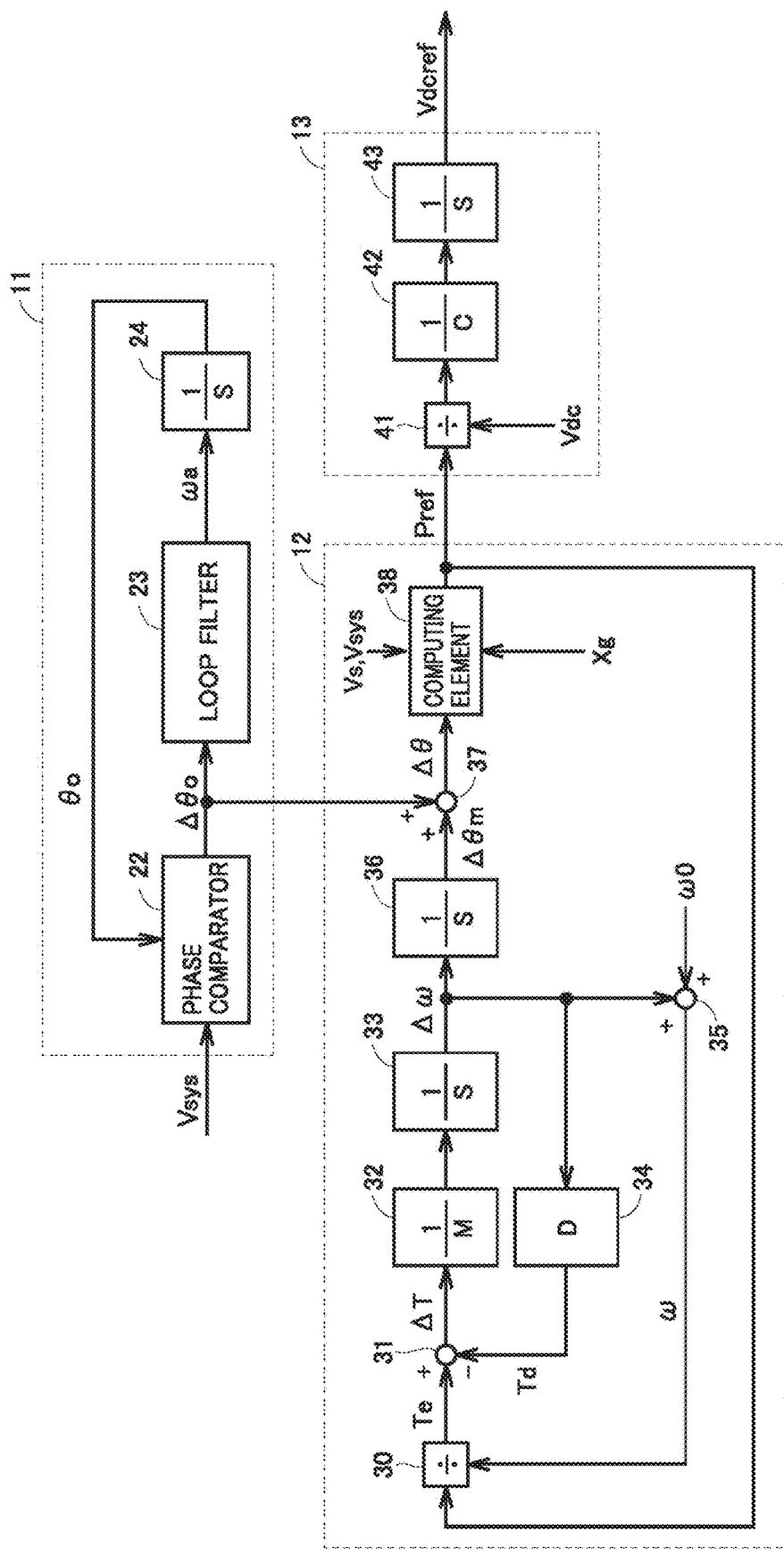
FIG. 3 is a block diagram showing a specific functional configuration of a phase synchronizing unit, a characteristics simulating unit, and a DC voltage command generating unit.

FIG. 3 is a block diagram showing a specific functional configuration of the phase synchronizing unit, the characteristics simulating unit, and the DC voltage command generating unit. Referring to FIG. 3, phase synchronizing unit 11 includes a phase comparator 22, a loop filter 23, and an integrator 24.

Phase comparator 22 calculates phase difference $\Delta\theta o$ based on AC voltage Vsys and reference phase $\theta o$. Specifically, phase comparator 22 calculates a d-axis voltage Vd and a q-axis voltage Vq by three phase/two phase conversion of AC voltages Vsysa, Vsysb, and Vsysc using reference phase $\theta o$. Phase comparator 22 calculates phase difference $\Delta\theta o$ between phase $\theta sys$ of AC voltage Vsys and phase $\theta$, based on d-axis voltage Vd and q-axis voltage Vq. Typically, $\Delta\theta o$ is represented by arctan(Vd/Vq). Loop filter 23 calculates an angular frequency $\omega a$ based on phase difference $\Delta\theta o$ and a predetermined transfer function G. Integrator 24 calculates reference phase $\theta o$ by integrating angular frequency $\omega a$ with respect to time.

Characteristics simulating unit 12 includes a divider 30, a subtractor 31, proportional elements 32 and 34, integrators 33 and 36, adders 35 and 37, and a computing element 38.

Divider 30 calculates a torque output value Te (=Pref/$\omega$) by dividing active power command value Pref by angular frequency $\omega$. Subtractor 31 calculates a difference $\Delta T$ (=Te−Td) between torque output value Te and damping torque Td. In this way, the damping force of a synchronous generator is simulated in the control of power converter 110. Proportional element 32 multiplies difference $\Delta T$ by "1/M". "M" is the moment of inertia (also referred to as inertia constant) of the rotor of the synchronous generator (hereinafter also referred to as "virtual synchronous generator") to be simulated by characteristics simulating unit 12. Active power command value Pref corresponds to a target value of active power to be output from power converter 110 to simulate the characteristics equivalent to the synchronous generator.

Integrator 33 outputs an angular frequency deviation $\Delta\omega$ by integrating the multiplication value of proportional element 32 (that is, $\Delta T/M$) with respect to time. Angular frequency deviation $\Delta\omega$ corresponds to the difference between angular frequency $\omega$ of the rotor of the virtual synchronous generator and a reference angular frequency $\omega 0$ of power grid 2. Reference angular frequency $\omega 0$ is the angular frequency of a reference frequency (for example, 50 Hz or 60 Hz) of power in power grid 2. Proportional element 34 calculates damping torque Td by multiplying angular frequency deviation $\Delta\omega$ by "D". "D" is a damping coefficient of the virtual synchronous generator. Adder 35 calculates angular frequency $\omega$ by adding angular frequency deviation $\Delta\omega$ and reference angular frequency $\omega 0$.

Integrator 36 outputs a phase deviation $\Delta\theta m$ by integrating angular frequency deviation $\Delta\omega$ with respect to time. Phase deviation $\Delta\theta m$ corresponds to the difference between the phase of AC voltage Vsys at interconnection point 4 and the phase of the rotor of the virtual synchronous generator. Adder 37 calculates a phase deviation $\Delta\theta$ (=$\Delta\theta m+\Delta\theta o$) by adding phase deviation $\Delta\theta m$ and phase difference $\Delta\theta o$ output from phase synchronizing unit 11. Phase deviation 40 corresponds to the difference between the phase of AC voltage Vsys at interconnection point 4 and the phase of AC voltage to be output from power converter 110.

Computing element 38 calculates active power command value Pref, based on a power supply voltage Vs of power grid 2, AC voltage Vsys at interconnection point 4, phase deviation $\Delta\theta$, and inductance Xg of power converter 110. It is assumed that power supply voltage Vs is the rated voltage. Computing element 38 calculates active power command value Pref by dividing the multiplication value of power supply voltage Vs, AC voltage Vsys, and phase deviation 40 (that is, Vs×Vsys×$\Delta\theta$) by inductance Xg.

As described above, characteristics simulating unit 12 generates active power command value Pref for simulating the characteristics of the synchronous generator using phase difference $\Delta\theta o$ output from phase synchronizing unit 11, moment of inertia M, and damping coefficient D.

DC voltage command generating unit 13 includes a divider 41, a proportional element 42, and an integrator 43. Divider 41 calculates a DC current command value Idcref (=Pref/Vdc) by dividing active power command value Pref by DC voltage Vdc detected by DC voltage detector 5. Proportional element 42 multiplies DC current command value Idcref calculated by divider 41 by "1/C". "C" represents the capacitance of power storage element 120.

Letting I and V be DC current and DC voltage of power storage element 120, respectively, I=C×(dV/dt) holds. Thus, integrator 43 generates DC voltage command value Vdcref by integrating the multiplication value of proportional element 42 (that is, Idcref/C) with respect to time.

Figure 4:
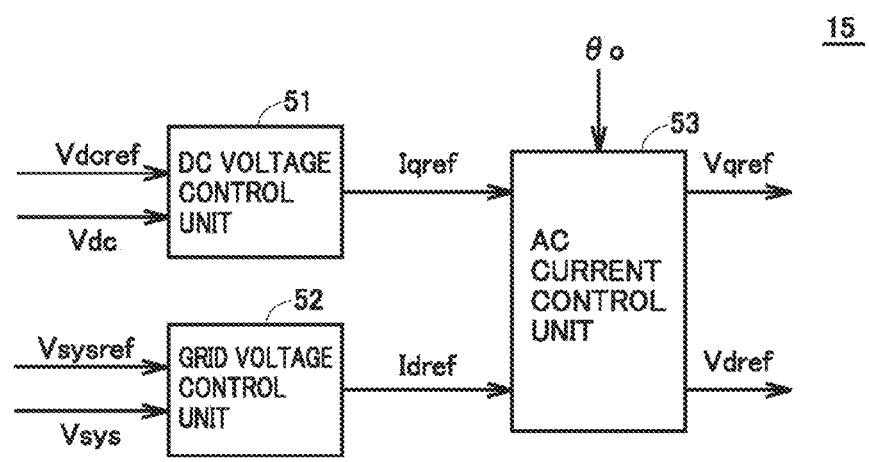
FIG. 4 is a block diagram showing an exemplary functional configuration of a voltage command generating unit.

FIG. 4 is a block diagram showing an exemplary functional configuration of the voltage command generating unit. Referring to FIG. 4, voltage command generating unit 15 includes a DC voltage control unit 51, a grid voltage control unit 52, and an AC current control unit 53.

DC voltage control unit 51 generates an active current command value Iqref for allowing DC voltage Vdc to follow DC voltage command value Vdcref. Specifically, DC voltage control unit 51 generates active current command value Iqref that is a command value of active current output from power converter 110, by feedback control for reducing the deviation between DC voltage command value Vdcref and DC voltage Vdc to zero. DC voltage control unit 51 controls a component related to active current of the AC voltage output from power converter 110. DC voltage control unit 51 is configured with a PI controller, a PID controller, or the like.

Grid voltage control unit 52 generates a reactive current command value Idref for allowing AC voltage Vsys to follow grid voltage command value Vsysref. Specifically, grid voltage control unit 52 generates reactive current command value Idref that is a command value of reactive current output from power converter 110, by feedback control for reducing the deviation between grid voltage command value Vsysref and AC voltage Vsys to a value smaller than a predetermined value. Grid voltage control unit 52 controls a component related to reactive current of the AC voltage output from power converter 110. Grid voltage control unit 52 is configured with a PI controller with slope, a first-order lag element, or the like.

AC current control unit 53 generates active voltage command value Vqref and reactive voltage command value Vdref, based on active current command value Iqref and reactive current command value Idref, and reference phase θo output from phase synchronizing unit 11.

Figure 5:
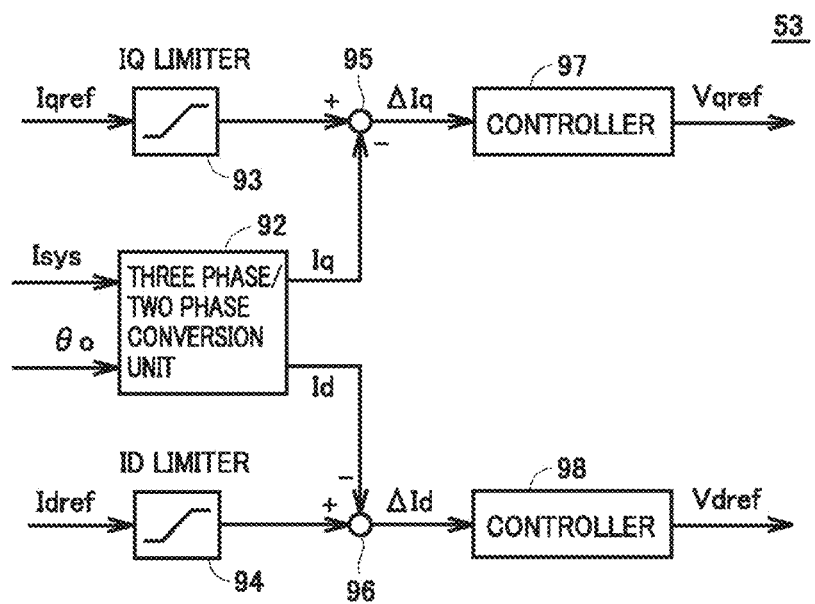
FIG. 5 is a block diagram showing a specific functional configuration of an AC current control unit.

FIG. 5 is a block diagram showing a specific functional configuration of the AC current control unit. Referring to FIG. 5, AC current control unit 53 includes a three phase/two phase conversion unit 92, an Iq limiter 93, an Id limiter 94, subtractors 95 and 96, and controllers 97 and 98.

Three phase/two phase conversion unit 92 calculates an active current Iq (that is, an active component of AC current Isys) and a reactive current Id (that is, a reactive component of AC current Isys) by performing three phase/two phase conversion of three phase AC current Isys on a positive phase coordinate system using reference phase θo.

Iq limiter 93 limits active current command value Iqref to within a range in accordance with an active current limit value Iqmax (that is, lower limit: −Iqmax, upper limit: +Iqmax). Subtractor 95 calculates a deviation ΔIq (=Iqref−Iq) between active current command value Iqref limited by Iq limiter 93 and active current Iq.

Controller 97 generates active voltage command value Vqref that is a command value of active voltage output from power converter 110, by feedback control for reducing the deviation ΔIq to zero. In other words, controller 97 generates active voltage command value Vqref for allowing active current Iq to follow active current command value Iqref. Controller 97 is configured with a PI controller, a PID controller, or the like.

Id limiter 94 limits reactive current command value Idref to within a range in accordance with a reactive current limit value Idmax (that is, lower limit: −Idmax, upper limit: +Idmax). Subtractor 96 calculates a deviation ΔId (=Idref−Id) between reactive current command value Idref limited by Id limiter 94 and reactive current Id.

Controller 98 generates reactive voltage command value Vdref that is a command value of reactive voltage output from power converter 110, by feedback control for reducing the deviation ΔId to zero. In other words, controller 98 generates reactive voltage command value Vdref for allowing reactive current Id to follow reactive current command value Idref. Controller 98 is configured with a PI controller, a PID controller, or the like.

As described above, AC current control unit 53 limits the magnitude of active current Iq by limiting active current command value Iqref to within a range in accordance with active current limit value Iqmax. AC current control unit 53 also limits the magnitude of reactive current Id by limiting reactive current command value Idref to within a range in accordance with reactive current limit value Idmax. As a result, the output current of power converter 110 is controlled to be less than threshold Th.

With the above configuration, the magnitude of AC current output from power converter 110 is limited. Thus, protective stop of power converter 110 due to overcurrent can be prevented when a short-circuit fault or the like occurs in power grid 2. Furthermore, since the active component and the reactive component of AC current can be limited independently, the priority of output limitation of the active component and the reactive component can be changed according to operation of the power grid.

<Modification of Voltage Command Generating Unit>

Figure 6:
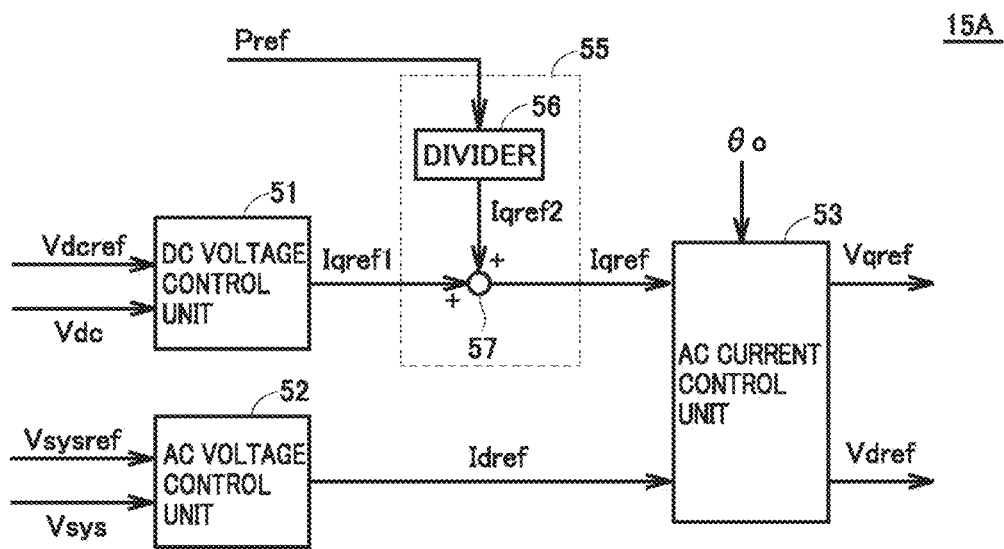
FIG. 6 is a block diagram showing a modification of the functional configuration of the voltage command generating unit.

FIG. 6 is a block diagram showing a modification of the functional configuration of the voltage command generating unit. Referring to FIG. 6, a voltage command generating unit 15A is a configuration in which a computing element 55 is added to voltage command generating unit 15 in FIG. 4. A configuration similar to that of voltage command generating unit 15 will not be further elaborated. In the description of FIG. 6, an active current command value generated by DC voltage control unit 51 is referred to as "active current command value Iqref1" for the sake of convenience.

Referring to FIG. 6, computing element 55 includes a divider 56 and an adder 57. Divider 56 calculates an active current command value Iqref2 by dividing active power command value Pref generated by characteristics simulating unit 12 by AC voltage Vsys. Adder 57 calculates an active current command value Iqref (=Iqref1+Iqref2) by adding active current command value Iqref1 and active current command value Iqref2. AC current control unit 53 performs a process similar to that in FIG. 4 based on the active current command value Iqref.

Here, in the configuration of voltage command generating unit 15 in FIG. 4, final active current command value Iqref is generated only by DC voltage control unit 51. On the other hand, in the configuration of voltage command generating unit 15A in FIG. 6, active power command value Pref is fed forward, so that active current command value Iqref2 is added to active current command value Iqref1 generated by DC voltage control unit 51 to produce a final active current command value Iqref.

In the configuration in FIG. 4, since active current command value Iqref is dependent only on the active current command value calculated by DC voltage control by DC voltage control unit 51, it is necessary that the output DC voltage of power storage element 120 should be changeable freely in accordance with the state of charge (SOC). It is therefore preferable that the relation between the output DC voltage of power storage element 120 and SOC is linear.

On the other hand, in the configuration in FIG. 6, active current command value Iqref is dependent not only on the active current command value calculated by DC voltage control by DC voltage control unit 51 but also on the active current command value converted based on the active power command value generated by characteristics simulating unit 12. Thus, a relatively appropriate active current command value Iqref can be obtained even when it is difficult to freely change the output DC voltage of power storage element 120 in accordance with SOC. Power storage element 120 therefore may be a power storage element that does not have a linear relation between output DC voltage and SOC.

Advantages

According to the first embodiment, overcurrent can be suppressed while control that simulates a synchronous generator is performed. Thus, protective stop of power converter 110 due to overcurrent can be prevented while suppressing frequency fluctuation of power grid 2 even when abrupt change in load, a short-circuit fault, or the like occurs in power grid 2.

Second Embodiment

<Overall Configuration>

Figure 7:
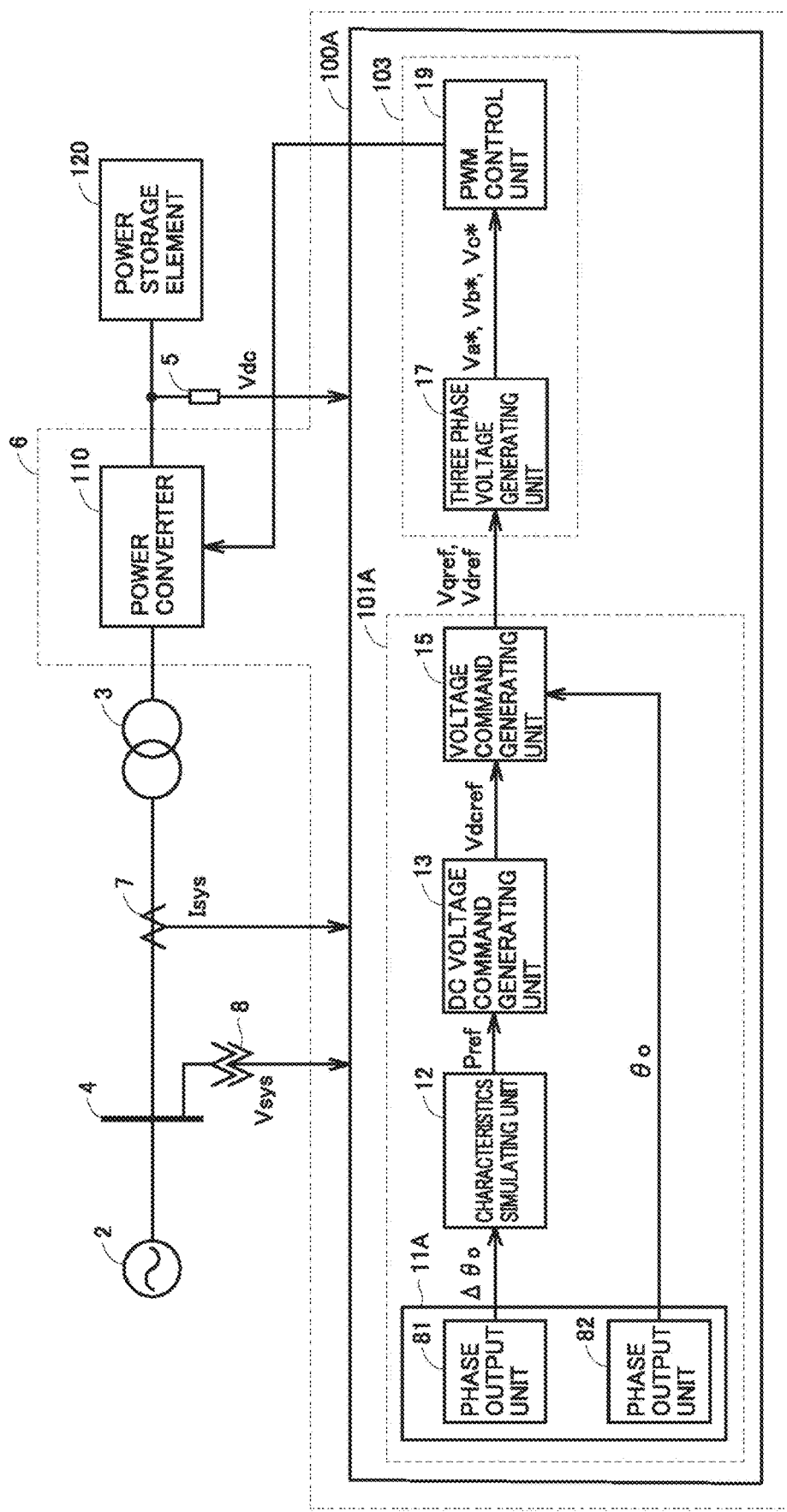
FIG. 7 is a diagram showing an overall configuration of a power conversion system according to a second embodiment.

FIG. 7 is a diagram showing an overall configuration of a power conversion system according to a second embodiment. In the power conversion system in FIG. 7, control device 100 of the power conversion system in FIG. 1 is replaced by a control device 100A. In control device 100A, generator simulating unit 101 of control device 100 is replaced by a generator simulating unit 101A. The configuration is similar to the configuration of FIG. 1 except for generator simulating unit 101A and will not be further elaborated.

Generator simulating unit 101A corresponds to a configuration in which phase synchronizing unit 11 of generator simulating unit 101 in FIG. 1 is replaced by a phase synchronizing unit 11A. Phase synchronizing unit 11A includes a phase output unit 81 and a phase output unit 82. Each of phase output unit 81 and phase output unit 82 has a functional configuration similar to that of phase synchronizing unit 11 in FIG. 3.

Specifically, phase output unit 81 estimates a reference phase θo of output voltage of power converter 110 synchronized with phase θsys of AC voltage Vsys, based on AC voltage Vsys at interconnection point 4. Phase output unit 81 outputs a phase difference Δθo between phase θsys and reference phase θo to characteristics simulating unit 12. Phase output unit 82 estimates reference phase θo based on AC voltage Vsys at interconnection point 4 and outputs reference phase θo to voltage command generating unit 15.

In this way, in the second embodiment, the function of outputting phase difference Δθo in phase synchronizing unit 11 in FIG. 1 is allocated to phase output unit 81, and the function of outputting reference phase θo in phase synchronizing unit 11 is allocated to phase output unit 82.

Here, reference phase θo calculated in phase output unit 82 is used for calculating an active current and a reactive current to be supplied to interconnection point 4, in AC current control unit 53 of voltage command generating unit 15. Thus, it is preferable that reference phase θo is brought as close as possible to the actual phase θsys of AC voltage Vsys at interconnection point 4. Phase output unit 82 is therefore set such that the control response is relatively fast.

On the other hand, phase difference Δθo calculated in phase output unit 81 is used for simulating a synchronous generator in characteristics simulating unit 12. In characteristics simulating unit 12, it is requested to output such an active power command value Pref that suppresses frequency fluctuation similarly to the characteristics of a synchronous generator when the frequency fluctuates due to a failure in power grid 2, abrupt change in load, or the like. Phase output unit 81 is therefore set such that the control response is relatively slow.

Based on the above, the response of phase output unit 81 is set to be slower than the response of phase output unit 82. Specifically, the control constant of loop filter 23 of phase output unit 81 is set such that response is slower than the control constant of loop filter 23 of phase output unit 82.

Advantages

According to the second embodiment, in addition to the advantages of the first embodiment, frequency change can be suppressed more in a failure of power grid 2 or the like, because the characteristics of a synchronous generator can be reproduced accurately.

Other Embodiments

The above configurations described as embodiments are examples of the configuration of the present disclosure, can be combined with other known techniques, and are susceptible to modifications such as partial omission without departing from the spirit of the present disclosure. In the foregoing embodiments, the processing and configuration described in other embodiments may be employed and carried out, if necessary.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST

2 power grid, 3 transformer, 4 interconnection point, 5 DC voltage detector, 6 power conversion device, 7 current detector, 8 voltage detector, 11, 11A phase synchronizing unit, 12 characteristics simulating unit, 13 DC voltage command generating unit, 15, 15A voltage command generating unit, 17 three phase voltage generating unit, 19 PWM control unit, 21 phase detector, 22 phase comparator, 23 loop filter, 51 DC voltage control unit, 52 grid voltage control unit, 53 AC current control unit, 70 input converter, 71 sample and hold circuit, 72 multiplexer, 73 A/D converter, 74 CPU, 75 RAM, 76 ROM, 77 input/output interface, 78 auxiliary storage device, 79 bus, 81, 82 phase output unit, 100, 100A control device, 101, 101A generator simulating unit, 103 signal generating unit, 110 power converter, 120 power storage element.

The invention claimed is:
1. A power conversion device comprising:
a power converter to perform power conversion between a power storage element and a power grid; and
a control device to control the power converter, wherein
the power converter converts a DC power output from the power storage element into an AC power and outputs the AC power to the power grid,
the control device includes
a phase synchronizing unit to estimate a reference phase of an output voltage of the power converter synchronized with a phase of an AC voltage at an interconnection point between the power grid and the power converter, based on the AC voltage at the interconnection point,
a characteristics simulating unit to generate an active power command value for the power converter by simulating characteristics of a synchronous generator based on a phase difference between the reference phase estimated by the phase synchronizing unit and the phase of the AC voltage at the interconnection point,
a DC voltage command generating unit to generate a DC voltage command value for the power converter, based on the active power command value and a DC voltage of the power storage element,
a voltage command generating unit to generate an AC voltage command value for the power converter so that an output current of the power converter becomes less than a threshold, based on the DC voltage command value, a grid voltage command value indicating a target value of the AC voltage at the interconnection point, and the reference phase, and a signal generating unit to generate a control signal for the power converter, based on the AC voltage command value.

2. The power conversion device according to claim 1, wherein the voltage command generating unit includes
a DC voltage control unit to generate an active current command value for allowing the DC voltage to follow the DC voltage command value,
a grid voltage control unit to generate a reactive current command value for allowing the AC voltage at the interconnection point to follow the grid voltage command value, and
an AC current control unit to calculate an active component and a reactive component of an AC current flowing between the interconnection point and the power converter, based on the reference phase and the AC current, and generate an active voltage command value for allowing the active component to follow the active current command value and a reactive voltage command value for allowing the reactive component to follow the reactive current command value, and
the AC voltage command value includes the active voltage command value and the reactive voltage command value.

3. The power conversion device according to claim 2, wherein the active current command value is limited to within a range in accordance with an active current limit value, and the reactive current command value is limited to within a range in accordance with a reactive current limit value.

4. The power conversion device according to claim 3, wherein the phase synchronizing unit outputs the reference phase to the voltage command generating unit and outputs the phase difference to the characteristics simulating unit.

5. The power conversion device according to claim 3, wherein the phase synchronizing unit includes
a first phase output unit to output the phase difference to the characteristics simulating unit, and
a second phase output unit to output the reference phase to the voltage command generating unit, and
a response of the first phase output unit is set to be slower than a response of the second phase output unit.

6. The power conversion device according to claim 2, wherein the phase synchronizing unit outputs the reference phase to the voltage command generating unit and outputs the phase difference to the characteristics simulating unit.

7. The power conversion device according to claim 2, wherein the phase synchronizing unit includes
a first phase output unit to output the phase difference to the characteristics simulating unit, and
a second phase output unit to output the reference phase to the voltage command generating unit, and
a response of the first phase output unit is set to be slower than a response of the second phase output unit.

8. The power conversion device according to claim 1, wherein the voltage command generating unit includes
a DC voltage control unit to generate a first active current command value for allowing the DC voltage to follow the DC voltage command value,
a grid voltage control unit to generate a reactive current command value for allowing the AC voltage at the interconnection point to follow the grid voltage command value, and
a computing element to calculate a second active current command value by dividing the active power command value by the AC voltage at the interconnection point, and calculate a third active current command value by adding the first active current command value and the second active current command value, and
an AC current control unit to calculate an active component and a reactive component of an AC current flowing between the interconnection point and the power converter, based on the reference phase and the AC current, and generate an active voltage command value for allowing the active component to follow the third active current command value and a reactive voltage command value for allowing the reactive component to follow the reactive current command value, and
the AC voltage command value includes the active voltage command value and the reactive voltage command value.

9. The power conversion device according to claim 8, wherein the third active current command value is limited to within a range in accordance with an active current limit value, and the reactive current command value is limited to within a range in accordance with a reactive current limit value.

10. The power conversion device according to claim 9, wherein the phase synchronizing unit outputs the reference phase to the voltage command generating unit and outputs the phase difference to the characteristics simulating unit.

11. The power conversion device according to claim 9, wherein the phase synchronizing unit includes
a first phase output unit to output the phase difference to the characteristics simulating unit, and
a second phase output unit to output the reference phase to the voltage command generating unit, and
a response of the first phase output unit is set to be slower than a response of the second phase output unit.

12. The power conversion device according to claim 8, wherein the phase synchronizing unit outputs the reference phase to the voltage command generating unit and outputs the phase difference to the characteristics simulating unit.

13. The power conversion device according to claim 8, wherein the phase synchronizing unit includes
a first phase output unit to output the phase difference to the characteristics simulating unit, and
a second phase output unit to output the reference phase to the voltage command generating unit, and
a response of the first phase output unit is set to be slower than a response of the second phase output unit.

14. The power conversion device according to claim 1, wherein the phase synchronizing unit outputs the reference phase to the voltage command generating unit and outputs the phase difference to the characteristics simulating unit.

15. The power conversion device according to claim 1, wherein the phase synchronizing unit includes
a first phase output unit to output the phase difference to the characteristics simulating unit, and
a second phase output unit to output the reference phase to the voltage command generating unit, and a response of the first phase output unit is set to be slower than a response of the second phase output unit.

* * * * *